United States Patent

Erickson

[15] 3,696,979
[45] Oct. 10, 1972

[54] CAR TOP CARRIER

[72] Inventor: Keith Duane Erickson, 3727 South 900 East, Salt Lake City, Utah 84106

[22] Filed: April 28, 1971

[21] Appl. No.: 138,060

[52] U.S. Cl. .................244/42.1 E, 220/18, 280/5 A
[51] Int. Cl. .................................................B60r 9/04
[58] Field of Search........224/42.1 R, 42.1 E, 42.1 G, 224/42.1 D, 42.1 F, 42.03 A; 280/5.1 F, 5 R, 5 A; 220/18

[56] References Cited

UNITED STATES PATENTS 1,966,022   7/1934   Sumner.....................280/5 A
3,265,262   8/1966   Motsinger.............224/42.1 R

FOREIGN PATENTS OR APPLICATIONS 820,047   9/1959   Great Britain.........296/137 R Primary Examiner—Gerald M. Forlenza
Assistant Examiner—Sidney Harris
Attorney—B. Deon Criddle

[57] ABSTRACT

A car top carrier having a base forming a gas or water tank and a walled top to support luggage and the like.

4 Claims, 6 Drawing Figures

PATENTED OCT 10 1972　　　　　　　　　3,696,979

INVENTOR:
KEITH DUANE ERICKSON

BY: B. Dean Criddle

ATTORNEY 3,696,979

CAR TOP CARRIER

BRIEF DESCRIPTION OF THE INVENTION

This invention relates to car top carriers of the type that are supported by clamps removably secured to the rain gutters of vehicles.

Prior Art

Removable car top carriers have long been known. These frequently comprise a rack with a base and upstanding walls between which objects to be carried can be placed. Suction cups are frequently placed on the ends of legs extending downwardly from the base to hold the carrier on the roof of a vehicle and clamps or straps extend from the base to engage a rain gutter or roof overhang for the same purpose. So far as I am aware, there has not heretofore been developed a carrier wherein the base is formed as a compartment capable of holding liquids such as gasoline or water while at the same time being adaptable to hold other items placed on top of the vehicle.

Many times, campers, miners and travellers find need for extra gasoline storage for use with their vehicles. Such persons may be travelling in a remote area where gasoline re-supply is not readily available or they just may want to take advantage of lower gasoline prices in one area. Many types of extra gasoline storage units have been proposed. Most frequently used are regular steel cans that are filled and then stored either inside the vehicle or strapped or otherwise affixed to the exterior side or rear panels of the vehicle. When the storage units are placed inside the vehicle valuable space that may be needed for passengers or for other purposes is used up and whether in or out of the vehicle it has generally been difficult to dispense the gasoline from the storage units to the regular vehicle gasoline tank. Generally the filled storage units are quite heavy and it is difficult to hold them as the gasoline is poured therefrom.

If the storage units are placed in a conventional car top carrier they take up room that could be used for other items and they must be placed on the base of the carrier or the load above the car becomes unstable. Consequently any items placed above them must be unloaded before the gasoline storage units are accessible and can be emptied into the vehicle gasoline tank.

SUMMARY OF THE INVENTION

Principal objects of the present invention are to provide a storage unit for gasoline (but useful also for transporting water, etc.) that can be placed on top of a vehicle and that will additionally serve as a car top carrier. Other objects are to provide such a storage unit that is adapted to fit a wide variety of vehicles and that includes means for expeditiously filling the tank thereof and for gravity feeding gasoline from the tank to the gasoline tank of a vehicle to which the gasoline is transferred.

Principal features of the invention include a steel tank lined with rubber or other suitable, non-rusting, gasoline resistant material forming a flat base and having rails extending upwardly around the periphery thereof. Support members having legs on opposite sides thereof extend beneath the tank and the usual suction cup feet are secured to the bottoms of the legs so that they will grip the roof of a vehicle. Conventional clamps are fixed to the ends of the support means, whereby the support means can be anchored to the vehicle rain gutters or roof overhang.

The tank is baffled to prevent liquid surge during vehicle starting, stopping, turning and bouncing. Opposed fill and vent systems allow the tank to be filled with gasoline from opposite sides thereof, with the side opposite that being filled always allowing for air venting.

A flexible, valved hose is connected into the bottom of the tank and a walled storage area, including a partial covering to prevent unwinding of the hose, especially during travel, is provided on top of the tank.

Additional objects and features of the invention will become apparent from the following detailed description and drawings, disclosing what is presently contemplated as being the best mode of the invention.

THE DRAWINGS

In the drawings:

FIG. 1 is a perspective view of the carrier of the invention shown on the roof of a vehicle, the vehicle being shown fragmentarily;

FIG. 2, an enlarged top plan view of the carrier;

FIG. 3, a vertical section taken on the line 3—3 of FIG. 2;

FIG. 4, a transverse vertical section taken on the line 4—4 of FIG. 2;

FIG. 5, an elevation view showing one side; and

FIG. 6, a view like that of FIG. 5, but showing the opposite side.

DETAILED DESCRIPTION

Figure 1:
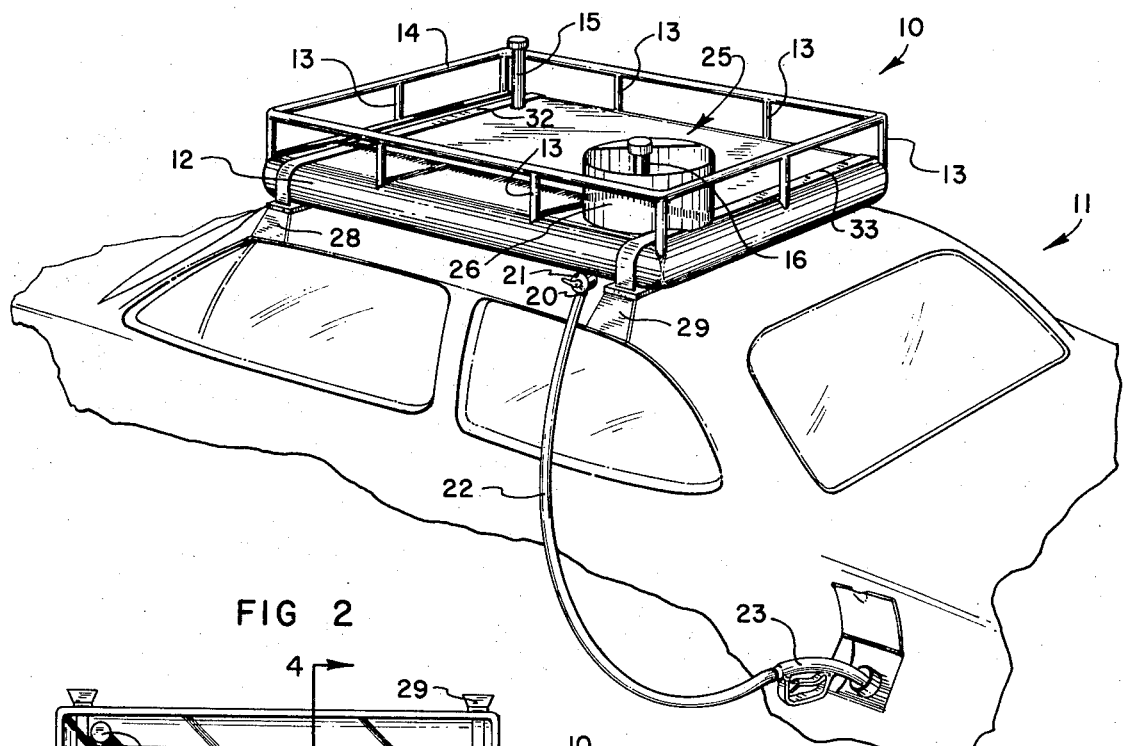
Figure 2:
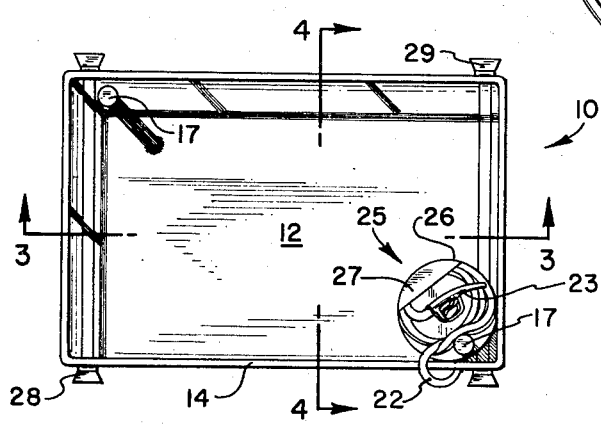
Figure 4:
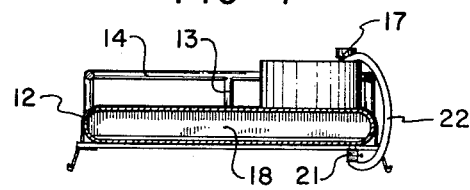
Figure 3:
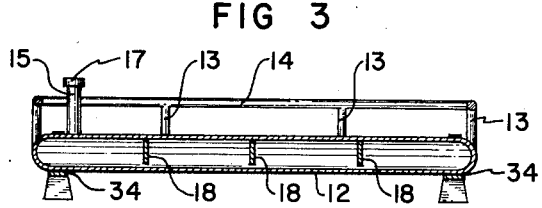
Figure 6:
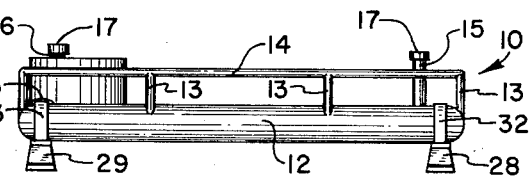
Figure 5:
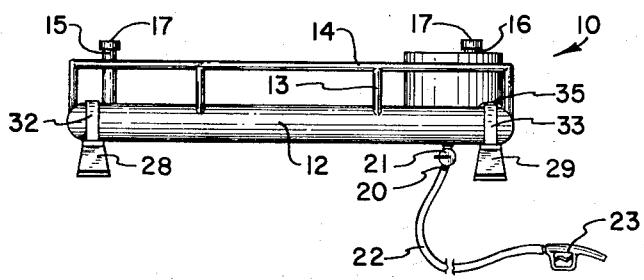

Referring now to the drawings:

In the illustrated preferred embodiment, the carrier of the invention shown generally at 10, is adapted to be mounted on the roof of a vehicle, shown generally at 11. While a sedan automobile has been illustrated as the vehicle, it should be apparent that vans, station wagons, and other vehicles, including pickup trucks having suitable cab roofs or camper bodies thereon, can accommodate the carrier. It is only necessary that the vehicle have a long enough roof line to support the container and a rain gutter or other overhang structure to which the carrier can be clamped.

The carrier consists of a flat steel tank 12 having relatively long lengths and widths in comparison to thickness. A typical example would have a length of 56 inches, a width of 48 inches and a thickness of from four to six inches. All connections between the top and bottom and the walls of the tank are welded and pressure tested to be sure that no leaks are present.

An upstanding fence, comprising spaced posts 13 welded to the top of tank 12 and an upper rail 14 interconnecting the tops of the posts extends around the outer edge of the tank.

A pair of filler spouts and air vents 15 and 16 are respectively positioned at diagonally opposite corners of the tank and extend upwardly from the top of the tank. The spouts each have a cap 17 thereon and when either cap is removed liquid can be put into the tank through the associated spout. The caps 17 are of vent type, and are conventionally known. Thus, as liquid is put into the tank through one spout, air can escape through the cap on the other spout. The double spout arrangement also allows the tank to be conveniently filled from either side of the vehicle. Furthermore, as will be hereinafter described in detail, the positioning of the spouts helps to prevent twisting of the tank on the vehicle.

The tank has a plurality of baffles 18 (three of which are shown) extending from side to side of the tank and running in direction transverse to the direction of travel of the carrier when it is mounted on a vehicle. Each baffle 18 is welded or otherwise affixed to the undersurface of the top of tank 12 and extends to within a short distance from the bottom of the tank. Thus, in conventional fashion, the baffles 18 prevent liquid surge as the vehicle on which the tank is mounted changes momentum, while at the same time allowing the entire tank to be filled. The inside of the tank and the baffles 18 are coated with rubber or other suitable material that is not adversely affected by water or gasoline to prevent rusting of the tank.

An outlet conduit 20, having a shut-off valve 21 therein is connected to the bottom of the tank 12 at a corner intended to serve as a rear corner of the tank and a long, flexible hose 22 has one end fixed to conduit 20 and a valved nozzle 23 on the other end.

A hose housing 25 is fixed to the top of tank 12, at the corner to which the hose 22 is connected. The hose housing comprises a generally circular wall 26, standing on the top of tank 12 and eccentrically surrounding the spout 16. A partial cover 27 extends across the portion of the wall 26 opposite spout 16.

In operation, valve 21 is opened to allow flow into hose 22 and the valved nozzle 23 is operated to permit flow from into a vehicle gas tank, boat tank, etc. Just before the desired volume of liquid has been transferred, valve 21 is operated to close off flow from tank 12 into hose 22 and to vent the hose to atmosphere. Nozzle 23 is then opened to allow liquid in the hose to be drained out and the vent through valve 21 prevents formation of a suction that could otherwise hold some of the liquid in the hose. The hose is therefor fully emptied before it is coiled and positioned in the coil housing for storage and transportation.

When the coiled hose is placed in housing 25 it is slid under the partial cover 27 and is compressed between wall 26 and the spout 16. Cover 27 keeps the hose from springing upwardly out of the housing and both the cover and the wall shield the hose from being blown out of the housing by wind as the vehicle on which the carrier is mounted travels.

Tank 12 is supported on racks 28 and 29, each of which has conventional legs 30 and clamping mechanisms 31 at the opposite ends thereof. The clamping mechanisms are used to removably secure the carrier to the top of a vehicle.

Metal straps 32 and 33 have their ends respectively connected to the racks 28 and 29 and extend over the tank 12 to hold it tightly to the racks 28 and 29. Rubber cushions 34 are preferably provided between the straps and the tank and between the tank and the racks so that any relative movement will not wear off the paint or other protective coating used to prevent development of rust.

The strap 32 extends snugly between spout 15 and an upstanding post 13 of the fence and the strap 33 extends through holes 35 provided therefor in the bottom of wall 26 and snugly between spout 17 and a post 13 supporting the rail 14.

The close fittings between the straps and their associated spouts and posts 13 prevents any twisting of the tank with respect to the racks 28 and 29.

Because the tank and racks are individually constructed, a single size tank can be used for many vehicles and it is only necessary to provide racks to fit the vehicle roof.

Although a preferred form of my invention has been herein disclosed, it is to be understood that the present disclosure is by way of example and that variations are possible without departing from the subject matter coming within the scope of the following claims, which subject matter I regard as my invention.

I claim:
1. A car top carrier comprising
   a flat tank having at least one baffle therein extending from one side wall to the other and restricting flow from one portion of the tank to another portion;
   a first inlet spout extending into the tank at the top thereof in a corner of the tank at one side of the baffle;
   a second inlet spout extending into the tank at the top thereof in a corner of the tank at the other side of the baffle and diagonally opposite the corner whereat the first spout is located;
   a discharge conduit connected into the bottom of the tank;
   a flexible hose having one end connected to said discharge conduit;
   a valved nozzle controlling flow through the other end of said hose;
   a valve in the discharge conduit controlling flow from the tank to the hose and for cutting off flow from the tank to the hose while venting the hose to atmosphere;
   storage means on top of the tank for the hose;
   a raised rail extending around the periphery of the tank; and
   means secured to the bottom of the tank for clamping to the roof of a vehicle.
2. A car top carrier as in claim 1, wherein
   cap means are provided to close the top of each spout, and said cap means has a vent means therein to allow air to escape from the tank but to prevent liquid escape therefrom.
3. A car top carrier as in claim 2, wherein
   the storage means comprises a circular wall standing on the top of the tank and a partial cover extending across said wall to cover a portion of the area within the wall.
4. A car top carrier as in claim 3, wherein
   the circular wall eccentrically surrounds one of said spouts and the surrounded spout helps to hold the hose in the housing.

* * * * *